US012682715B2

(12) United States Patent
Bhagat et al.

(10) Patent No.: US 12,682,715 B2
(45) Date of Patent: Jul. 14, 2026

(54) COVER DEVICE FOR RETAINING A PLURALITY OF VALUE DOCUMENTS IN A COMPARTMENT SPACE, USE OF THE COVER DEVICE, SYSTEM AND BANKNOTE STACKING MODULE

(71) Applicant: Giesecke+Devrient Currency Technology GmbH, Munich (DE)

(72) Inventors: Simranjeet Bhagat, Pathankot (IN); Vishal Handa, Shahabad Markanda (IN)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 58 days.

(21) Appl. No.: 18/716,375

(22) PCT Filed: Dec. 8, 2022

(86) PCT No.: PCT/EP2022/025557

§ 371 (c)(1), (2) Date: Jun. 4, 2024

(87) PCT Pub. No.: WO2023/104335

PCT Pub. Date: Jun. 15, 2023

(65) Prior Publication Data

US 2025/0042686 A1 Feb. 6, 2025

(30) Foreign Application Priority Data

Dec. 9, 2021 (IN) ............................ 202111057388

(51) Int. Cl.

*G07D 11/14* (2019.01)
*B65H 31/02* (2006.01)
*G07D 11/10* (2019.01)

(52) U.S. Cl.

CPC ............. *G07D 11/14* (2019.01); *B65H 31/02* (2013.01); *G07D 11/10* (2019.01); *B65H 2301/42144* (2013.01); *B65H 2701/1912* (2013.01)

(58) Field of Classification Search

CPC ................................ G07D 11/10; G07D 11/14
See application file for complete search history.

(56) References Cited

U.S. PATENT DOCUMENTS 8,515,573 B2 * 8/2013 Morino .................. H04L 45/02 194/215
9,567,182 B2 * 2/2017 Takada .................. B65H 31/24
9,586,784 B2 * 3/2017 Hodatsu .................. B65H 7/20

(Continued)

FOREIGN PATENT DOCUMENTS

EP 3 376 477 A1 9/2018
EP 3 836 098 A1 6/2021
WO 2021/106371 A1 6/2021

*Primary Examiner* — Patrick Cicchino

(74) *Attorney, Agent, or Firm* — Workman Nydegger

(57) ABSTRACT cover device for retaining a plurality of value documents in a compartment space). The cover device comprises a base unit extending in a main longitudinal direction, as well as a retaining element. A coupling element defines a hinge axis that allows the retaining element to pivot relative to the base unit between a closed position and an opened position. The hinge axis is inclined with respect to the main longitudinal direction. The invention further relates to a system and a banknote stacking module.

17 Claims, 4 Drawing Sheets

(56) References Cited

U.S. PATENT DOCUMENTS

| | | | | |
|---|---|---|---|---|
| 9,842,453 | B2 * | 12/2017 | Hemmi | G07D 11/50 |
| 11,189,123 | B2 * | 11/2021 | Tamahashi | G07D 11/14 |
| 11,804,094 | B2 * | 10/2023 | Nakaoka | B65H 83/02 |
| 2020/0027300 | A1 | 1/2020 | Baydin et al. | |
| 2021/0312746 | A1 * | 10/2021 | Fujita | G07D 11/40 |
| 2022/0044514 | A1 * | 2/2022 | Baydin | B65B 57/10 |

* cited by examiner

COVER DEVICE FOR RETAINING A PLURALITY OF VALUE DOCUMENTS IN A COMPARTMENT SPACE, USE OF THE COVER DEVICE, SYSTEM AND BANKNOTE STACKING MODULE

The disclosure generally relates to banknote sorting and/or stacking systems. In particular, the invention relates to a cover device and a system for retaining a plurality of value documents in a compartment space as well as using the cover device for retaining banknotes in a banknote stacker compartment. The invention further relates to a banknote stacking module comprising the system for retaining a plurality of value documents in a compartment space.

Stacker compartment covers for banknote stackers are usually used to retain banknotes from falling out of the corresponding compartment space in which the banknotes are collected before they are removed or withdrawn by a user. Known stacker compartment covers are opened by means of hinges to enable an opening in order to provide access to the stacker compartment. However, existing stacker compartment covers may restrict the movements of a user, in particular the motion-sequence of a user of the banknote stacker when attempting to withdraw the banknotes collected within the stacker compartment. In particular, it has repeatedly happened that the user was restricted in their movements when reaching into the compartment space for removing the banknotes.

It may be seen as a plurality of value documents of the invention to facilitate withdrawal of a plurality of value documents from a compartment space.

A cover device according to the features of the independent claim is provided. Further embodiments are evident from the dependent claims and from the following description.

According to an aspect, an, in particular value document, cover device for retaining a plurality of value documents, in particular banknotes, in a compartment space is provided. The cover device comprises a base unit extending in a main longitudinal direction between a first end of the base unit and a second end of the base unit. The cover device comprises a first retaining element and in particular a second retaining element, wherein in particular each of the first retaining element and the second retaining element is coupled to the base unit such that the first retaining element and the second retaining element are spaced apart from each other in the main longitudinal direction. The cover device further comprises a first coupling element for pivotably coupling the first retaining element to the base unit such that the first retaining element is pivotable relative to the base unit between a closed position and an opened position. The first coupling element defines a first hinge axis about which the first retaining element is pivotable relative to the base unit. The first hinge axis is inclined with respect to the main longitudinal direction. Particularly, it is possible that the first retaining element and the second retaining element are spaced apart from each other in the main longitudinal direction when both retaining elements are in the closed position, or when both retaining elements are in the opened position.

Such a cover device may be used to receive and retain plurality of value documents within a compartment space, for example to collect banknotes in a compartment space before they are withdrawn from the compartment space by a user. The cover device may thus be a part of a system or a platform, for example a system that outputs one or more plurality of value documents, for example sheet-like plurality of value documents or banknotes, and retains the one or more plurality of value documents within the compartment space associated to the system or platform.

The cover device may provide an opening mechanism which helps the user of the system to access the compartment space in which the plurality of value documents is received before withdrawal by the user. In particular, the retaining elements which retain or hold the plurality of value documents within the compartment space can be opened according to a specified movement which considerably facilitates the withdrawal of the plurality of value documents, e.g., the banknotes, from the compartment space. This opening movement can occur with respect to the base unit, which base unit may be mounted to the surrounding system or platform in which the cover device is integrated.

The fact that the first hinge axis, about which the first retaining element can be pivoted, is inclined with respect to the main longitudinal direction, along which the base unit extends, provides a rotational movement that moves the first retaining element closer to a center point or plane of the cover device and thus away from the user standing in front of the cover device. In other words, an access opening for providing an access for a user to reach into the compartment space and withdraw the plurality of value documents from the compartment space is enlarged, which makes the withdrawal of the plurality of value documents easier and more comfortable for the user.

Furthermore, the rotational movement that moves the first retaining element about the inclined hinge axis may tilt the first retaining element such that an outer lateral edge of the first retaining element that points away from the second retaining element is moved in an upward direction faster than an inner lateral edge of the first retaining element that points towards the second retaining element. Preferably, a size of the opening, e.g., an opening angle, of the outer lateral edge of the first retaining element is larger than a size of the opening of the inner lateral edge of the first retaining element when the first retaining element is opened. Therefore, the rotational movement of the first retaining element during its opening is also advantageous, particularly for banknote stacking systems, due to an improved contact between the first retaining element with a top edge of stacked banknotes. It is noted that the first and second retaining elements are spaced apart from each other and may therefore be arranged in juxtaposition to each other in the main longitudinal direction.

The base unit of the cover device may be a longitudinal component which extends in the main longitudinal direction. The first retaining element may be coupled to the base unit via the first coupling unit, such that the first retaining element may substantially extend perpendicular with respect to the main longitudinal direction. The first hinge axis may allow a pivot movement of the first retaining element relative to the base unit, i.e., about the hinge axis. This pivot movement of the first retaining element relative to the base unit may be a rotational movement by which the first retaining element is rotatable with respect to the base unit.

The second retaining element may also be coupled to the base unit, but at a different position than the first retaining element, such that the second retaining element and the first retaining element are spaced apart from one another in the main longitudinal direction. In particular, the main longitudinal direction may define a direction in which the first retaining element and the second retaining element are spaced apart from each other, for example when both retaining elements are in the closed position and/or when both retaining elements are in the opened position.

The first and/or second retaining element may have a flap-like structure, for example flaps having side walls which are angled with respect to each other to cover or enclose at least a part of the compartment space. The flaps may each include a coupling end at which the flaps are coupled to the base unit, a free end having an edge opposite to the coupling end, and inner and outer lateral edges connecting the coupling end and the free end. Due to their flap-like structures, the retaining elements may herein also be referred to as flaps or cover flaps.

The closed position may define a position or state of the first retaining element and the second retaining element in which both retaining elements cover at least a part of the compartment space. The opened position may define a position or state of the first retaining element and the second retaining element in which both retaining elements uncover a substantial part of the compartment space.

It is noted that the direction in which the first retaining element is pivoted relative to the base unit can be adjusted by the orientation of the first hinge axis with respect to the main longitudinal direction. In particular, the inclination of the first hinge axis with respect to the main longitudinal direction together with the possibly flap-like appearance of the first retaining element may facilitate the accessibility to the compartment space. In particular, the inclined hinge of the first hinge axis may allow the outer lateral edge of the respective cover flap to open up to a greater extent than the inner lateral edge when the cover flap is moved from the closed position to the opened position. This will provide a better usability to remove the plurality of value documents(s), e.g., the stack of banknotes, from the compartment space.

According to an embodiment, the cover device further comprises a second coupling element for pivotably coupling the second retaining element to the base unit such that the second retaining element is pivotable relative to the base unit between a closed position and an opened position, wherein the second coupling element defines a second hinge axis about which the second retaining element is pivotable relative to the base unit, and wherein the second hinge axis is inclined with respect to the main longitudinal direction.

The second retaining element may be coupled to the base unit in the same manner as the first retaining element is coupled to the base unit, but about another hinge axis. The first retaining element and the second retaining element may be arranged symmetrically to each other with respect to a symmetry plane that is arranged perpendicular to the main longitudinal direction and located between the first and second retaining elements. In this case the center of the cover device would lie on said symmetry plane. With respect to this symmetry plane, the first hinge axis and the second hinge axis may thus be arranged symmetrically to each other. It is possible that also the base unit has a symmetrical shape with respect to said symmetry plane.

It is noted that the opened position of the second retaining element may correspond to the opened position of the first retaining element and that the closed position of the second retaining element may correspond to the closed position of the first retaining element. In particular, when both retaining elements are in their opened position, they may be spaced apart in the main longitudinal direction. Accordingly, when both retaining elements are in their closed position, they may also be spaced apart in the main longitudinal direction.

According to an embodiment, the first retaining element and the second retaining element define a first distance between each other in the main longitudinal direction when both the first retaining element and the second retaining element are in the closed position, wherein the first retaining element and the second retaining element define a second distance between each other in the main longitudinal direction when both the first retaining element and the second retaining element are in the opened position, and wherein the first distance is greater than the second distance.

In other words, when the first retaining element and second retaining element are both simultaneously moved from the closed position to the opened position, then a distance between the inner lateral edges of the first and second retaining elements decreases, i.e., a distance between both retaining elements is reduced. Accordingly, when the first retaining element and second retaining element are both simultaneously moved from the opened position to the closed position, then a distance between the inner lateral edges of the first and second retaining elements increases, i.e., a distance between both retaining elements is increased. During the opening or closing movements of the first and second retaining elements, the distance may be reduced or increased continuously.

According to an embodiment, the first retaining element has a coupling end which couples the first retaining element via the first coupling element to the base unit, wherein the first retaining element has a first free end defining a first edge, which first edge extends along a first edge extension direction, and wherein the first hinge axis is inclined with respect to the main longitudinal direction such that an angle between the main longitudinal direction and the first edge extension direction is changed upon movement of the first retaining element from the closed position to the opened position.

It is possible that, in the closed position, the first edge extension direction of the first edge at the free end of the first retaining element is substantially or exactly arranged parallel with respect to the main longitudinal direction. When the first retaining element is moved from the closed position to the opened position, an acute angle between the first edge extension direction and the main longitudinal direction may occur.

In an example, the second retaining element also has a coupling end which couples the second retaining element via the second coupling element to the base unit, wherein the second retaining element has a second free end defining a second edge, which second edge extends along a second edge extension direction, and wherein the second hinge axis is inclined with respect to the main longitudinal direction such that an angle between the main longitudinal direction and the second edge extension direction is changed upon movement of the second retaining element from the closed position to the opened position. It is possible that, in the closed position, the second edge extension direction of the second edge at the free end of the second retaining element is substantially or exactly arranged parallel with respect to the main longitudinal direction. When the second retaining element is moved from the closed position to the opened position, an acute angle between the second edge extension direction and the main longitudinal direction may occur.

According to an embodiment, the first hinge axis is inclined with respect to the main longitudinal direction such that the angle between the main longitudinal direction and the first edge extension direction is increased upon movement of the first retaining element from the closed position to the opened position.

This inclined arrangement of the first hinge axis with respect to the main longitudinal direction may cause the first edge extension direction to be increased continuously upon movement of the first retaining element from the closed position to the opened position.

In an example, also the second hinge axis is inclined with respect to the main longitudinal direction such that the angle between the main longitudinal direction and the above-mentioned second edge extension direction is increased upon movement of the second retaining element from the closed position to the opened position.

This inclined arrangement of the second hinge axis with respect to the main longitudinal direction may cause the second edge extension direction to be increased continuously upon movement of the second retaining element from the closed position to the opened position.

According to an embodiment, the main longitudinal direction and the first hinge axis define a horizontal plane.

In an example, the main longitudinal direction, the first hinge axis and the second hinge axis define a horizontal plane. This means that the first hinge axis and the second hinge axis may lie within the same plane. However, both axes may be angled with respect to each other in this horizontal plane. For example, both inclined hinge axes may show a V-shape in the horizontal plane. It should be understood that the horizontal plane may be a virtual plane defining the relative orientations of the axes and longitudinal direction within the cover device.

The base unit may include an upper side extending parallel with respect to said horizontal plane. Furthermore, at least a part of the first retaining element may include a wall that extends substantially parallel with respect to the horizontal plane when the first retaining element is in the closed position. Accordingly, at least a part of the second retaining element may include a wall that extends substantially parallel with respect to the horizontal plane when the second retaining element is in the closed position. In this case, said walls of the retaining elements may be substantially aligned or flush with the upper side of the base unit.

According to an embodiment, the first retaining element and the second retaining element are symmetrically arranged with respect to a symmetry plane that is perpendicular to the main longitudinal direction.

For example, the first hinge axis and the second hinge axis are symmetrically arranged with respect to said symmetry plane. It is possible that also the base unit has a symmetrical shape with respect to said symmetry plane.

According to an embodiment, the first retaining element is a flap-like element having two side walls being angularly arranged with respect to each other, wherein the side walls of the first retaining element define or enclose at least a part of the compartment space for retaining the plurality of value documents when the first retaining element is arranged in the closed position.

In an example, also the second retaining element is a flap-like element having two side walls being angularly arranged with respect to each other, wherein the side walls of the second retaining element define or enclose at least a part of the compartment space for retaining the plurality of value documents when the second retaining element is arranged in the closed position. In particular, the side walls of the first and/or second retaining element may delimit the compartment space and hinder the plurality of value documents from inadvertently falling out of the compartment space.

According to an embodiment, the base unit has a mounting mechanism for releasably mounting the base unit to a platform system via the first end of the base unit and via the second end of the base unit.

The platform system may be an external or surrounding system into which the cover unit is to be integrated to provide the above-indicated functions and advantages. The mounting mechanism may include locator pins, for example spring-loaded locator pins, to position or align the base unit within the platform system. The base unit may also include lateral side walls at the respective ends of the base unit. These lateral side walls and/or the locator pins may be spaced apart from each other in the main longitudinal direction. Furthermore, the lateral side walls and/or the locator pins may be symmetrically arranged to each other with respect to the symmetry plane that is perpendicular to the main longitudinal direction.

According to an aspect, the cover device as described herein is used for retaining banknotes in a banknote stacker compartment.

In particular, the cover device may fulfill the function of a retaining mechanism that prevents banknotes from falling out of a stacker compartment of a banknote output system, e.g., banknote stacker system. The cover device, as described herein, may advantageously provide an opening mechanism which helps the user of the system to access the stacker compartment in which the banknotes are collected before withdrawal by the user.

According to a further aspect, a system for retaining a plurality of value documents in a compartment space is provided. The system comprises the cover device as described herein. Said system also comprises a lower retaining unit having a free end defining a lower edge. The first retaining element has a free end defining a first upper edge, which may be the first edge extending along the first edge extension direction as described above. The lower edge is arranged opposite to the first upper edge and the first upper edge is inclined with respect to the lower edge when the first retaining element is in the opened position.

The system may be a banknote output system or a banknote stacker system, wherein the cover device may prevent banknotes from falling out of the compartment space, e.g., the stacker compartment of the banknote output system or the banknote stacker system. In contrast to the retaining elements of the cover device, the lower retaining unit may be fixedly mounted within the system. It is possible that also the base unit of the cover device may be fixedly mounted within the system. However, the base unit may be releasably mounted within the system, for example by means of a quick-release mechanism including the above-mentioned locator pins.

The first retaining element, e.g., the cover flap, of the cover device may be moved from the closed to the opened position as described above, such that the resulting opening that provides access to the stacker compartment space is designed to be at an angle. This will be described in more detail when referring to the description of the drawings hereinafter.

According to an embodiment, the lower edge is arranged substantially or exactly parallel with respect to the first upper edge when the first retaining element is in the closed position.

The lower edge may contact the first upper edge or may be spaced apart therefrom when the first retaining element is in the closed position.

According to an embodiment, the second retaining element has a free end defining a second upper edge, which may be the second edge extending along the second edge extension direction as described above. In this embodiment, the lower edge is arranged opposite to the second upper edge, wherein the second upper edge is inclined with respect to the lower edge when the second retaining element is in the opened position.

Like the first retaining element, the second retaining element carries out a movement similar to a tilting movement towards the center of the cover device when the retaining elements are moved from the closed position to the opened position. Therefore, both the first upper edge and the second upper edge will increase their inclination angle with respect to the main longitudinal direction and thus also with respect to the lower edge which is fixed within the system.

According to an embodiment, the lower edge is arranged substantially parallel with respect to the second upper edge when the second retaining element is in the closed position.

The lower edge may contact the second upper edge or may be spaced apart therefrom when the second retaining element is in the closed position.

According to an aspect, a banknote stacking module comprising the system as described herein is provided.

The present invention will hereinafter be described in conjunction with the following drawing figures, wherein like numerals denote like elements, and wherein.

Figure 1:
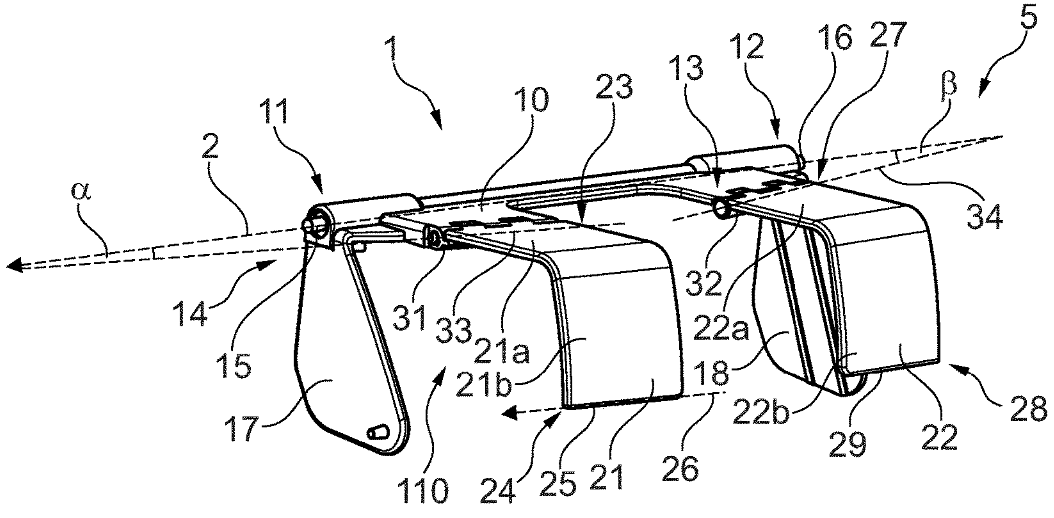
FIG. 1 shows a cover device.

The representations and illustrations in the drawings may be schematic and not to scale. A better understanding of the method and system described above may be obtained through a review of the shown illustrations together with a review of the detailed description that follows.

FIG. 1 shows a cover device 1 for retaining a plurality of value documents, in particular banknotes, (not shown) in a compartment space 110. The cover device 1 comprises a base unit 10 which extends in a main longitudinal direction 2 between a first end 11 of the base unit 10 and a second end 12 of the base unit 10. The base unit 10 has a mounting mechanism 14, wherein the mounting mechanism 14 includes a first locator pin 15 arranged at the first end 11 of the base unit 10 as well as a second locator pin 16 arranged at the second end 12 of the base unit 10. The mounting mechanism 14 is adapted to releasably mount the entire cover device 1 in a system as will be described with reference to FIGS. 2 to 9 below. The base unit 10 also has a first lateral side wall 17 extending at the first end 11 and extending laterally with respect to an upper side 13 of the base unit 10. Furthermore, the base unit 10 has a second lateral side wall 18 extending at the second end 12 and extending laterally with respect to the upper side 13 of the base unit 10. The side walls 17, 18 of the base unit 10 may include further fixation elements, such as pins or the like, to releasably mount the base unit 10 to a system.

The cover device 1 further comprises a first retaining element 21 and a second retaining element 22, each of the first retaining element 21 and the second retaining element 22 being separately coupled to the base unit 10 such that the first retaining element 21 and the second retaining element 22 are spaced apart from one another in the main longitudinal direction 2. A first coupling element 31 pivotably couples the first retaining element 21 to the base unit 10 such that the first retaining element 21 can be pivoted relative to the base unit 10 between a closed position 5 and an opened position. It is noted that FIG. 1 shows the first and second retaining elements 21, 22 in the closed position 5.

The first coupling element 31 includes a first hinge axis 33 about which the first retaining element 21 can be pivoted relative to base unit 10. In particular, the pivot coupling between the base unit 10 and the first retaining element 21 allows for a rotational movement of the first retaining element 21 relative to the base unit 10 in order to move the first retaining element 21 from the closed position 5 into the opened position. In this regard, it is noted that the first hinge axis 33 is inclined, i.e., angled, with respect to the main longitudinal direction 2. For example, the main longitudinal direction 2 and the first hinge axis 33 may enclose an acute angle $\alpha$. Said angle $\alpha$ may be between 1 degree and 45 degrees, between 2 degrees and 35 degrees, between 5 degrees and 25 degrees, or between 10 degrees and 20 degrees.

The cover device 1 also comprises a second coupling element 32 including a second hinge axis 34 which pivotably couples the second retaining element 22 to the base unit 10, for example in the same manner as the first coupling element 31 couples the first retaining element 21 to the base unit 10. In particular, the pivot coupling between the base unit 10 and the second retaining element 22 allows for a rotational movement of the second retaining element 22 relative to the base unit 10 in order to move the second retaining element 22 from the closed position 5 into the opened position. It is possible that also the second hinge axis 34 is inclined, i.e., angled, with respect to the main longitudinal direction 2 as shown in FIG. 1. For example, the main longitudinal direction 2 and the second hinge axis 34 may enclose an acute angle $\beta$. Said angle $\beta$ may be between 1 degree and 45 degrees, between 2 degrees and 35 degrees, between 5 degrees and 25 degrees, or between 10 degrees and 20 degrees.

The main longitudinal direction 2, the first hinge axis 33 and the second hinge axis 34 may all lie within a single plane and therefore define a horizontal plane as will be further described with respect to FIG. 7 below. Accordingly, the above indicated angles $\alpha$ and $\beta$ are measured in the horizontal plane. The upper side 13 of the base unit 10 may extend parallel to this horizontal plane.

The first retaining element 21 may include a flap-like element, such as shown in FIG. 1. The first retaining element 21 therefore has a first side wall 21*a* and a second side wall 21*b* being angularly arranged with respect to each other. Both side walls 21*a*, 21*b* together define at least a part of the compartment space 110 when the first retaining element 21 is in the closed position 5. As can be derived from FIG. 1, the first retaining element 21 is coupled to the base unit 10 via a coupling end 23 which is a part of the first side wall 21*a*. The first retaining element 21 further includes a first free end 24 defining a first edge 25, herein also referred to as first upper edge 25, wherein the first edge 25 extends along a first edge extension direction 26.

Figure 9:
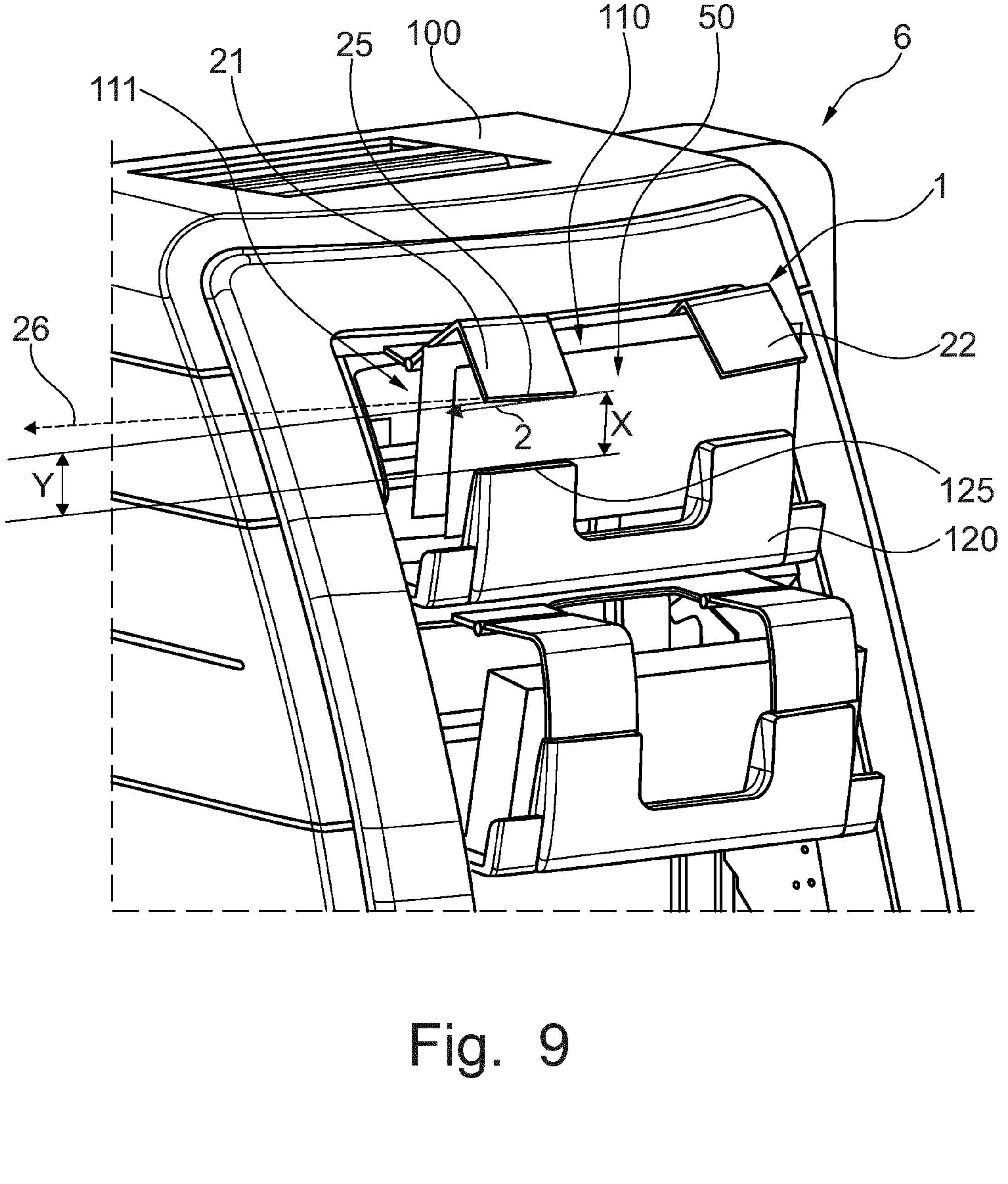
FIG. 9 shows another perspective sectional view of a system comprising the cover device of FIG. 1 in an opened position.

The inclination of the first hinge axis 33 with respect to the main longitudinal direction 2 causes an angle between the main longitudinal direction 2 and the first edge extension direction 26 to change, e.g., increase, upon movement of the first retaining element 21 from the closed position 5 to the opened position 6 as shown in FIG. 9.

In addition, the second retaining element 22 also has a first side wall 22*a* and a second side wall 22*b* being angularly arranged with respect to each other. Both side walls 22*a*, 22*b* together define at least a further part of the compartment space 110 when the second retaining element 22 is in the closed position 5. The second retaining element 22 is coupled to the base unit 10 via a coupling end 27 which is a part of the first side wall 22*a*. The second retaining element 22 further includes a second free end 28 defining a second edge 29, herein also referred to as second upper edge 29, wherein the second edge 29 extends along a second edge extension direction (not shown).

The inclination of the second hinge axis 34 with respect to the main longitudinal direction 2 also causes an angle between the main longitudinal direction 2 and the second edge extension direction to change, e.g., increase, upon movement of the second retaining element 22 from the closed position 5 to the opened position.

Figure 2:
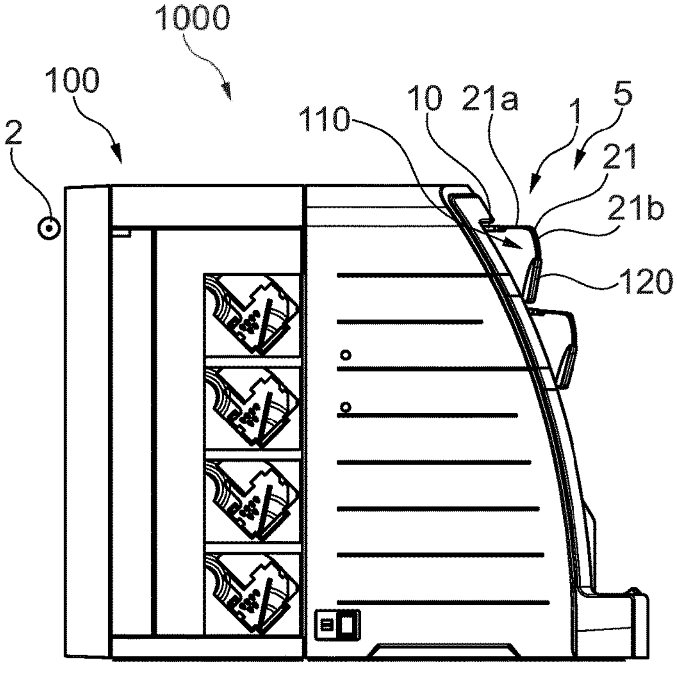
FIG. 2 shows a front view of a system comprising the cover device of FIG. 1.

FIG. 2 shows a front view of a system 100 comprising the cover device 1 as described above with reference to FIG. 1. The system 100 may for instance be a banknote output system or a banknote stacker system. The front view of system 100 as illustrated in FIG. 2 may represent a front side of the banknote stacker system from where a user might access the compartment space 110 during removal of the banknotes (not shown) from the compartment space 110. The longitudinal direction 2 thus points out of the drawing plane in FIG. 2. The cover device 1 with its retaining elements 21, 22 prevents the banknotes from falling out of the compartment space 110. The retaining elements 21, 22 of the cover device 1 are in the closed position 5. It is noted, that in the illustrated front view, the second retaining element 22 is covered by the first retaining element 21 such that only the first retaining element 21 is visible in FIG. 2.

The system 100 further comprises a lower retaining unit 120 that, together with the retaining elements 21, 22, encloses at least a part of the compartment space 110 when the retaining elements 21, 22 are in the closed position 5. In FIG. 1, the angled arrangement of the side walls 21*a*, 21*b* of the first retaining element 21 can be recognized. This angled arrangement of the side walls 21*a*, 21*b* is such that the first retaining element 21 at least partly extends around the compartments space 110. In this case, a lower edge comprised by the lower retaining unit 120 may interact, for example gets in contact, with the upper edge of the first retaining element 21. The lower retaining unit 120 may be fixedly mounted within the system 100. The base unit 10 of the cover device 1 may be fixedly but releasably mounted within the system 100. The retaining elements 21, 22, however, may be the moveable components in the system 100 that provide the access to the compartment space 110 when opened.

Figure 3:
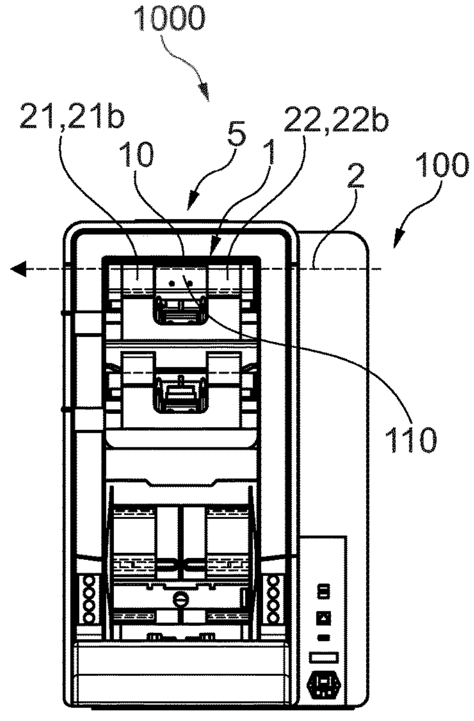
FIG. 3 shows a side view of a system comprising the cover device of FIG. 1.

FIG. 3 shows a side view of the system 100 comprising the cover device 1 of FIG. 1 in the closed position 5, i.e., as seen from the right in FIG. 2. The side view of system 100 as illustrated in FIG. 3 may represent the right side of the banknote stacker system from where a user might also access the compartment space 110 during removal of the banknotes (not shown) from the compartment space 110. As can be seen, the first retaining element 21 and the second retaining element 22, both being pivotably coupled to the base unit 10, are spaced apart from each other with respect to the main longitudinal direction 2. From this perspective, the second side walls 21*b* and 22*b* of the retaining elements 21, 22 can be seen. The first retaining element 21 and the second retaining element 22 are symmetrically arranged with respect to a symmetry plane that is perpendicular to the main longitudinal direction 2 and is arranged half-way between the first retaining element 21 and the second retaining element 22.

Figure 4:
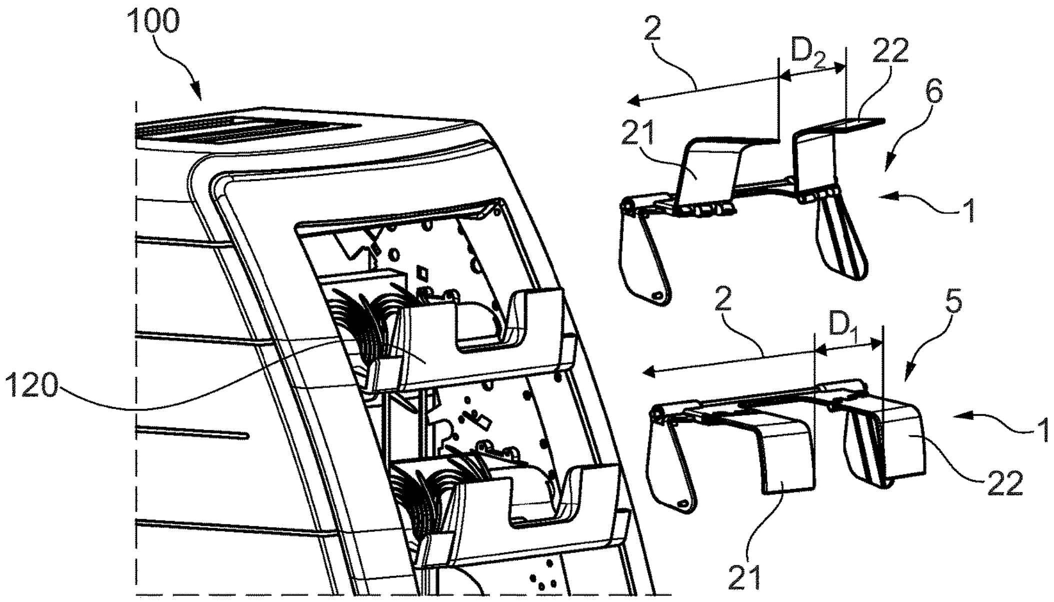
FIG. 4 shows a perspective sectional view of a system illustrating the cover device of FIG. 1 demounted from the system and illustrating the cover device in an opened position as well as in a closed position.

FIG. 4 shows a perspective sectional view of a system 100, e.g., the system as described with reference to FIGS. 2 and 3. FIG. 4 illustrates the cover device 1 of FIG. 1 in a demounted configuration, in which the cover device 1 is demounted, i.e., released from the system 100. The lower retaining unit 120 is fixedly mounted within the system 100. The illustration on the right top shows the cover device 1 in an opened position 6 and the illustration on the right bottom shows the cover device 1 in the closed position 5. The illustrations show the retaining elements 21, 22, i.e., the cover flaps, and the orientation of the main longitudinal direction 2. In addition, two distances $D_1$ and $D_2$ are indicated. In particular, the above-described inclinations of the first and second hinge axes 33, 34 (cf. FIG. 1) cause the retaining elements 21, 22 to pivot towards each other, e.g., to tilt towards a center of the cover device 1, when moving them from the closed position 5 to the opened position 6. Therefore, the first retaining element 21 and the second retaining element 22 define the first distance $D_1$ between each other in the main longitudinal direction 2 when both the first retaining element 21 and the second retaining element 22 are in the closed position 5, whereas the first retaining element 21 and the second retaining element 22 define the second distance $D_2$ between each other in the main longitudinal direction 2 when both the first retaining element 21 and the second retaining element 22 are in the opened position 6. The inclinations of the hinge axes 33, 34 (cf. FIG. 1) cause the first distance $D_1$ to be greater than the second distance $D_2$, since the retaining elements 21, 22 have pivoted towards each other to a certain amount when opening the same.

Figure 5:
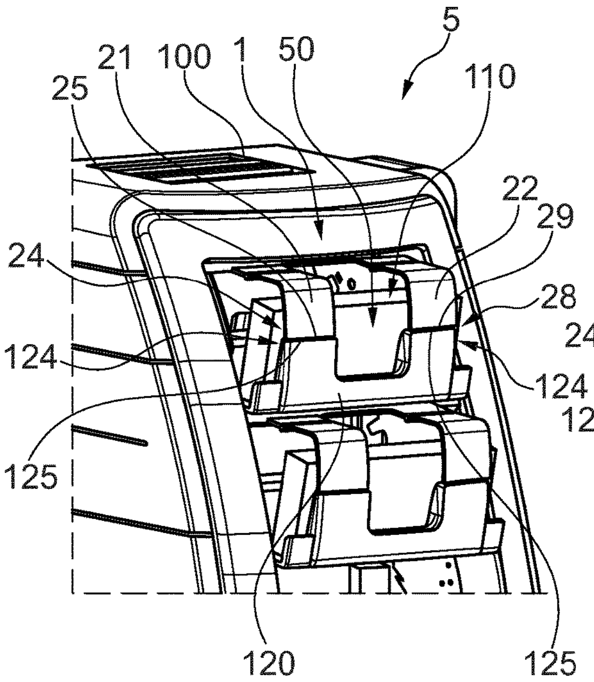
FIG. 5 shows a perspective sectional view of a system comprising the cover device of FIG. 1 in a closed position.
Figure 6:
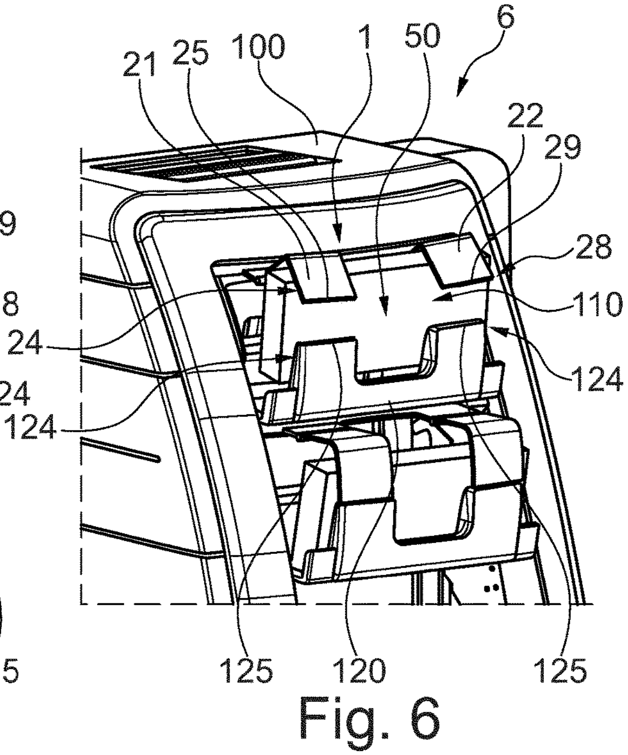
FIG. 6 shows a perspective sectional view of a system comprising the cover device of FIG. 1 in an opened position.

FIG. 5 shows a perspective sectional view of the system 100 comprising the cover device 1 of FIG. 1 in the closed position 5, and FIG. 6 shows the same perspective sectional view of the system 100 comprising the cover device 1 of FIG. 1 in the opened position 6. FIG. 5 may represent a scenario when the banknotes 50 are stacked into the compartment space 110 and the cover device 1 is in the closed position 5. FIG. 6 may represent how the user can access the banknotes 50 for removal from the compartment space 110 by accessing the banknotes 50 from either of the right side or the front side of the system 100. With reference to FIGS. 5 and 6, the movement of the retaining elements 21, 22 during the opening process from the closed position 5 to the opened position 6 will now be described in more detail.

As indicated above, the system comprises the lower retaining unit 120. This lower retaining unit 120 has a free end 124 defining a lower edge 125. The lower retaining unit 120 may be curved and may include two protrusions extending upwardly with respect to the system 100, such that two lower edges 125 are provided at the lower retaining unit 120. As also indicated above, first retaining element 21 has the free end 24 defining the first upper edge 25 which extends along the first edge extension direction 26 (cf. FIGS. 1 and 9). The lower edge 125 comprised by one of the protrusions of the lower retaining unit 120 is arranged opposite to the first upper edge 25.

As can be seen from a comparison of FIGS. 5 and 6, the lower edge 125 is arranged substantially or exactly parallel with respect to the first upper edge 25 when the first retaining element 21 is in the closed position 5 (FIG. 5). In contrast, the first upper edge 25 is inclined with an angle different from zero with respect to the lower edge 125 when the first retaining element 21 is in the opened position 6 (FIG. 6). This is due to the fact that the angle between the first edge extension direction 26, which represents the extension direction of the first upper edge 25 (cf. FIG. 1), and the main longitudinal direction 2 increases during movement of the first retaining element 21 from the closed position 5 to the opened position 6.

The same applies for the second retaining element 22. As indicated above and illustrated in FIGS. 5 and 6, the second retaining element 22 has the free end 28 defining the second upper edge 29 which extends along a second edge extension direction. The lower edge 125 comprised by another one of the protrusions of the lower retaining unit 120 is arranged opposite to the second upper edge 29.

As can be seen from a comparison of FIGS. 5 and 6, the lower edge 125 is arranged substantially or exactly parallel with respect to the second upper edge 29 when the second retaining element 22 is in the closed position 5 (FIG. 5). In contrast, the second upper edge 29 is inclined with an angle different from zero with respect to the lower edge 125 when the second retaining element 22 is in the opened position 6 (FIG. 6). This is again due to the fact that the angle between the second edge extension direction, which represents the extension direction of the second upper edge 29, and the main longitudinal direction 2 increases during movement of the second retaining element 22 from the closed position 5 to the opened position 6.

When in the opened position 6, the retaining elements 21, 22 generally provide access to the compartment space 110. In particular, due to the increasing angles of the edges 25, 29 of the respective retaining elements 21, 22, the retaining elements 21, 22 are tilted in such a way that the access to the compartment space 110 is further enlarged and therefore improved, as can be derived from FIG. 6 showing the opened position 6. A user can thus withdraw the plurality of value documents 50, e.g., the banknotes 50, more easily from the compartment space 110.

Figure 7:
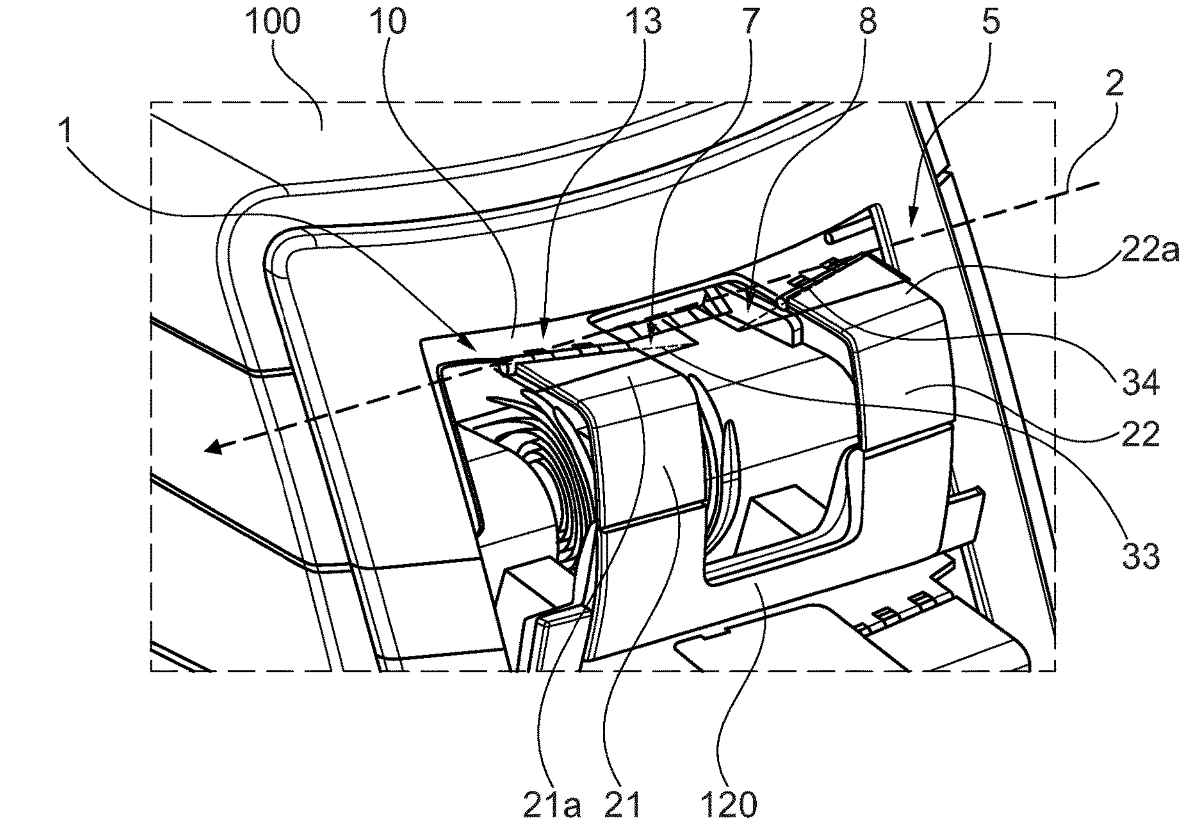
FIG. 7 shows another perspective sectional view of a system comprising the cover device of FIG. 1 in a closed position.

FIG. 7 shows another perspective sectional view of the system 100 comprising the cover device 1 of FIG. 1 in the closed position 5 as well as the lower retaining unit 120. As can be seen from this Figure, the main longitudinal direction 2 and the first hinge axis 33 about which the first retaining element 21 rotates with respect to the base unit 10 lie within the horizontal plane 7. Accordingly, the main longitudinal direction 2 and the second hinge axis 34 about which the second retaining element 22 rotates with respect to the base unit 10 lie within the further horizontal plane 8. The planes 7, 8 are each indicated by a rectangle in FIG. 7 and may be congruent with one another. The upper side 13 of the base unit 10 may be parallel with respect to one or both of the horizontal planes 7, 8. Furthermore, at least a part of the first retaining element 21, i.e., the first wall 21*a*, may extend substantially parallel with respect to the horizontal plane 7 when the first retaining element 21 is in the closed position 5. Accordingly, at least a part of the second retaining element 22, e.g., the first wall 22*a*, may extend substantially parallel with respect to the horizontal plane 8 when the second retaining element 22 is in the closed position 5. In this case, said first walls 21*a*, 22*a* of the respective retaining elements 21, 22 may be aligned or flush with the upper side 13 of the base unit 10.

Figure 8:
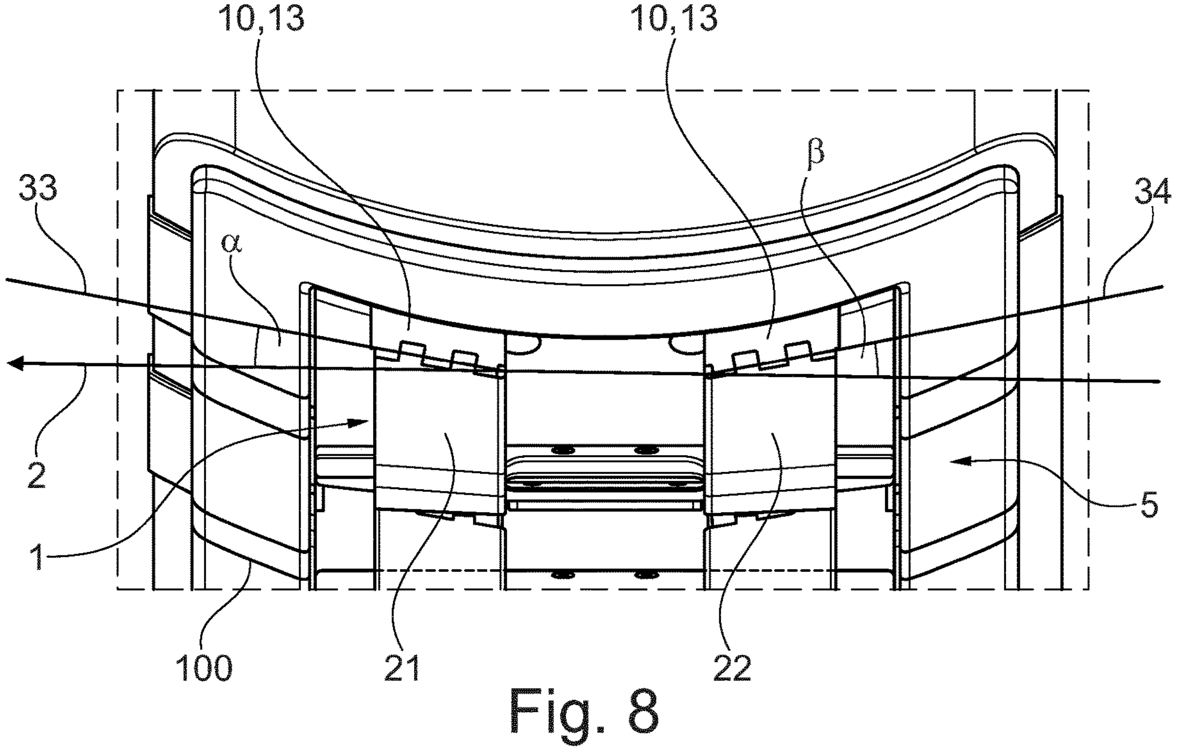
FIG. 8 shows a top sectional view of a system comprising the cover device of FIG. 1 in a closed position.

FIG. 8 shows a top sectional view of the system 100 comprising the cover device 1 of FIG. 1 in the closed position 5. This Figure shows a top view of the inclination angles $\alpha$ and $\beta$ with which the hinge axes 33, 34 of the associated retaining elements 21, 22 are oriented with respect to the main longitudinal direction 2 (cf. FIG. 1). FIG. 8 also shows a part of the base unit 10, in particular the upper side 13 of the base unit 10 which faces in an upward direction with respect to the system 100 when the cover device 1 is mounted within the system 100.

FIG. 9 shows another perspective sectional view of the system 100 comprising the cover device 1 of FIG. 1 in the opened position 6. The stacker cover opening 111 providing the access to the compartment space 110 is designed to be at an angle. In particular, the inclined hinge axis 33 as shown in FIG. 8 above will allow the retaining element's 21, 22, e.g., the stacker cover flap's, outermost lateral edges to open up more than the inner lateral edges and will provide better usability to remove the stack of banknotes 50 from the compartment space 110. In the opened position 6 and possibly already during the opening of the retaining elements 21, 22, the distance Y is greater than the distance X. Distance Y indicates a distance from the lower edge 125 of the lower retaining unit 120 to a corner between the first upper edge 25 and an outer lateral edge of the first retaining element 21. Distance X indicates a distance from the lower edge 125 of the lower retaining unit 120 to a corner between the first upper edge 25 and an inner lateral edge of the first retaining element 21. This is due to the increasing angle between the first edge extension direction 26 with respect to the main longitudinal direction 2 when opening the first retaining element 21. The same may apply to the second retaining element 22.

The resulting inclined stacker cover opening 111 assists the user when removing the banknotes 50 due to a change in contact of the retaining elements 21, 22 with a top edge of stacked banknotes 50, in particular when the user starts pulling out a stack of banknotes 50 from a full or partially filled stacker compartment space 110. This design therefore improves the usability of the stacker compartment space 110, for example if the user accesses the banknotes 50 from somewhere between front and right side of the system 100.

The cover device 1 and the system 100 as described herein may thus facilitate withdrawal of a plurality of value documents 50, for example banknotes 50, from a stacker compartment space 110. The cover device 1 particularly prevents the banknotes 50 output into the compartment space 110 from flying out of the compartment space 110 due to any reason. The cover device 1 is a detachable or modular accessory to the system 100. A user has flexibility to mount the cover device 1 into the system 100 or to remove it when not required.

The invention claimed is:

1. A cover device for retaining a plurality of value documents in a compartment space, comprising:

- a base unit extending in a main longitudinal direction between a first end of the base unit and a second end of the base unit, the main longitudinal direction extending perpendicular to a direction in which the value documents enter the compartment space;
- at least a first retaining element;
- wherein the first retaining element is coupled to the base unit;
- a first coupling element for pivotably coupling the first retaining element to the base unit such that the first retaining element is pivotable relative to the base unit between a closed position and an opened position;

wherein the first coupling element defines a first hinge axis about which the first retaining element is pivotable relative to the base unit;

wherein the first hinge axis is inclined at an acute angle with respect to the main longitudinal direction.

2. The cover device according to claim 1, further comprising:

a second coupling element for pivotably coupling a second retaining element to the base unit such that the second retaining element is pivotable relative to the base unit between a closed position and an opened position;

wherein the second coupling element defines a second hinge axis about which the second retaining element is pivotable relative to the base unit;

wherein the second hinge axis is inclined with respect to the main longitudinal direction.

3. The cover device according to claim 2, wherein the first retaining element and the second retaining element define a first distance between each other in the main longitudinal direction when both the first retaining element and the second retaining element are in the closed position;

wherein the first retaining element and the second retaining element define a second distance between each other in the main longitudinal direction when both the first retaining element and the second retaining element are in the opened position;

wherein the first distance is greater than the second distance.

4. The cover device according to claim 1, wherein the first retaining element has a coupling end which couples the first retaining element via the first coupling element to the base unit;

wherein the first retaining element has a first free end defining a first edge, which first edge extends along a first edge extension direction;

wherein the first hinge axis is inclined with respect to the main longitudinal direction such that an angle between the main longitudinal direction and the first edge extension direction is changed upon movement of the first retaining element from the closed position to the opened position.

5. The cover device according to claim 4, wherein the first hinge axis is inclined with respect to the main longitudinal direction such that the angle between the main longitudinal direction and the first edge extension direction is increased upon movement of the first retaining element from the closed position to the opened position.

6. The cover device according to claim 1, wherein the main longitudinal direction and the first hinge axis define a horizontal plane.

7. The cover device according to claim 2, wherein the first retaining element and the second retaining element are symmetrically arranged with respect to a symmetry plane that is perpendicular to the main longitudinal direction.

8. The cover device according to claim 1, wherein the first retaining element is a flap-like element having two side walls being angularly arranged with respect to each other, wherein the side walls of the first retaining element define at least a part of the compartment space for retaining the plurality of value documents when the first retaining element is arranged in the closed position.

9. The cover device according to claim 1, wherein the base unit has a mounting mechanism for releasably mounting the base unit to a platform system via the first end of the base unit and via the second end of the base unit.

10. Use of the cover device according to claim 1 for retaining banknotes in a banknote stacker compartment.

11. A system for retaining a plurality of value documents in a compartment space, comprising:

the cover device according to claim 1;

a lower retaining unit;

wherein the lower retaining unit has a free end defining a lower edge;

wherein the first retaining element has a free end defining a first upper edge;

wherein the lower edge is arranged opposite to the first upper edge;

wherein the first upper edge is inclined with respect to the lower edge when the first retaining element is in the opened position.

12. The system according to claim 11, wherein the lower edge is arranged substantially parallel with respect to the first upper edge when the first retaining element is in the closed position.

13. The system according to claim 11, wherein the cover device further comprises a second coupling element for pivotably coupling a second retaining element to the base unit such that the second retaining element is pivotable relative to the base unit between a closed position and an opened position, wherein the second coupling element defines a second hinge axis about which the second retaining element is pivotable relative to the base unit, wherein the second hinge axis is inclined with respect to the main longitudinal direction, wherein the second retaining element has a free end defining a second upper edge;

wherein the lower edge is arranged opposite to the second upper edge;

wherein the second upper edge is inclined with respect to the lower edge when the second retaining element is in the opened position.

14. The system according to claim 13, wherein the lower edge is arranged substantially parallel with respect to the second upper edge when the second retaining element is in the closed position.

15. A banknote stacking module comprising the system according to claim 11.

16. A cover device for retaining a plurality of value documents in a compartment space, comprising:

a base unit extending in a main longitudinal direction between a first end of the base unit and a second end of the base unit;

at least a first retaining element and a second retaining element;

wherein the first retaining element is coupled to the base unit;

a first coupling element for pivotably coupling the first retaining element to the base unit such that the first retaining element is pivotable relative to the base unit between a closed position and an opened position;

wherein the first coupling element defines a first hinge axis about which the first retaining element is pivotable relative to the base unit;

wherein the first hinge axis is inclined at an acute angle with respect to the main longitudinal direction, wherein the main longitudinal direction extends in a direction in which the first retaining element and the second retaining element are spaced apart from each other.

17. A cover device for retaining a plurality of value documents in a compartment space, comprising:

a base unit extending in a main longitudinal direction between a first end of the base unit and a second end of the base unit;

at least a first retaining element;

wherein the first retaining element is coupled to the base unit;

a first coupling element for pivotably coupling the first retaining element to the base unit such that the first retaining element is pivotable relative to the base unit between a closed position and an opened position;

wherein the first coupling element defines a first hinge axis about which the first retaining element is pivotable relative to the base unit;

wherein the first hinge axis is inclined at an acute angle with respect to the main longitudinal direction and the main longitudinal direction extends perpendicularly to a direction in which the first retaining element extends from the base unit.

* * * * *